United States Patent [19]

Anderson

[11] 4,172,288
[45] Oct. 23, 1979

[54] BINARY OR BCD ADDER WITH PRECORRECTED RESULT

[75] Inventor: Jack L. Anderson, Scottsdale, Ariz.

[73] Assignee: Motorola, Inc., Schaumburg, Ill.

[21] Appl. No.: 916,409

[22] Filed: Jun. 16, 1978

Related U.S. Application Data

[63] Continuation of Ser. No. 860,510, Dec. 15, 1977, abandoned, which is a continuation of Ser. No. 664,460, Mar. 8, 1976, abandoned.

[51] Int. Cl.² .............................................. G06F 7/50
[52] U.S. Cl. .................................................. 364/771
[58] Field of Search ................................ 364/771, 772

[56] References Cited

U.S. PATENT DOCUMENTS

| | | | |
|---|---|---|---|
| 3,089,644 | 5/1963 | Wensley | 364/771 |
| 3,486,015 | 12/1969 | Asada et al. | 364/772 |
| 3,711,693 | 1/1973 | Dahl | 364/771 |
| 3,809,872 | 5/1974 | Yamamura et al. | 364/772 |
| 3,813,623 | 5/1974 | Namiya et al. | 364/782 |
| 3,935,438 | 1/1976 | Grupe | 364/771 |
| 3,991,307 | 11/1976 | Peddle et al. | 364/786 X |

OTHER PUBLICATIONS

Agrawal, "Fast BCD/Binary Adder/Subtractor", *Electronics Letters*, vol. 10, No. 8, Apr. 1974, pp. 121–122.
Kolsky, "Adding Technique with Simultaneous Correction & Carry", *IBM Tech. Disclosure Bulletin*, vol. 7, No. 7, Dec. 1964, p. 591.

*Primary Examiner*—David H. Malzahn
*Attorney, Agent, or Firm*—Robert A. Farley; Anthony J. Sarli, Jr.; Marvin A. Glazer

[57] ABSTRACT

An adder provides either binary or binary coded decimal operation under the selection of a control input. The data inputs are a pair of four bit operands and a carry in for providing an additional capability of greater than four bits. Outputs, in addition to the four bit result, include carry propagate and carry generate signals for the four bit group. Binary operation is conventional. For binary coded decimal operation, the adder corrects an initial binary result to the binary coded decimal format by adding six when there is a group carry generate signal present thus forming an intermediate result. This intermediate result is formed before the occurrence of the carry in from a preceding stage. In the final stage of the adder, the intermediate result is incremented to form the final four bit result if there is a carry in.

6 Claims, 4 Drawing Figures

BINARY OR BCD ADDER WITH PRECORRECTED RESULT

This is a continuation of application Ser. No. 860,510, filed Dec. 15, 1977, now abandoned, which is a continuation of application Ser. No. 664,460 filed Mar. 8, 1976, now abandoned.

BACKGROUND OF THE INVENTION

This invention pertains in general to digital adder circuits and in particular to an adder for binary or binary coded decimal operands.

In digital computers, addition is one of the most fundamental operations and the wide spread development of various types of digital computers has correspondingly resulted in the development of a wide variety of circuits and techniques for performing addition. Since most digital computers function by manipulating data and instructions expressed as binary numbers, most digital logic and circuit developments relating to addition concern the addition of binary numbers. As is well known, the speed with which binary operands can be added is primarily determined by the speed with which carries generated by the addition of individual binary digits can be propagated. Various techniques and circuits for reducing this carry propagation delay time have been developed. The most widely used method for high speed binary addition is commonly referred to as look ahead carry addition. The basic principle of look ahead carry addition is the examination of a number of inputs to each adder stage and the simultaneous production of the proper carries for each of these stages. The application of the carries to the adder block for each stage then produces the proper sum bits. Depending upon the number of look ahead carry levels, the overall add time can be significantly reduced. Although the digital circuitry used in computers make the binary representation of numbers and binary arithmetic the most straightforward approach to solving arithmetic problems, human interface requirements often dictate the use of decimal representation of numbers. Thus, most modern computers provide a capability of operating with both binary numbers and coded decimal numbers such as binary coded decimal (BCD). At low speeds, arithmetic operations involving BCD numbers can be performed with the same hardware which is used to perform binary arithmetic by using software algorithms. If computing speed requirements preclude the use of software algorithms, special digital circuits particularly adapted to BCD arithmetic must be used. One such technique which uses digital circuits specifically designed to perform only BCD arithmetic is described in the paper "High Speed Decimal Addition" by Schmoockler and Weinberger published in the IEEE Transactions on Computers, Volume C20, Number 8, August, 1971. Although this approach gives high speed addition capability for BCD numbers, it requires circuitry that is dedicated only for this purpose and therefore implies additional cost in machines which must also perform binary operations.

Another approach to the problem of BCD addition is to perform addition on the BCD operands as though they were binary numbers to form an intermediate result and then correcting this result to form the correct BCD digit of the sum. The usual method for correcting the intermediate result is to add binary 6. The basis for this method is explained in the textbook "Arithmetic Operations in Digital Computers" by R. K. Richards, D. Van Nostrand Co., Inc., Princeton, N.J., 1955 pp 210–211. Although this approach offers circuit advantages relating to the fact that portions of the logic circuits required for binary arithmetic operations can also be used for BCD arithmetic, it has limitations with respect to speed. These limitations arise because the time required to add the BCD operands to form an intermediate result depends upon the carry propagation delay time. The total time required to obtain the correct BCD representation of the sum thus includes the time required to form the intermediate result and the time required to apply the BCD correction factor so that BCD addition is inherently slower than binary addition.

SUMMARY OF THE INVENTION

Accordingly, it is an object of this invention to provide an improved adder circuit for binary coded decimal numbers.

It is a further object of this invention to provide an improved adder circuit for forming the sum of binary or of binary coded decimal operands in which the correction factor required for binary coded decimal addition is applied to a preliminary result before the occurrence of a carry-in signal from previous adder stage.

Briefly described, the present invention is an adder circuit for binary or binary coded decimal addition in which binary coded decimal addition is performed by adding the operands as binary numbers without carry-in to obtain a first result, applying a correction factor as required before carry-in is present to obtain a second result and incrementing the second result with carry-in to obtain the correct binary coded decimal digit of the sum.

DETAILED DESCRIPTION

Figure 1:
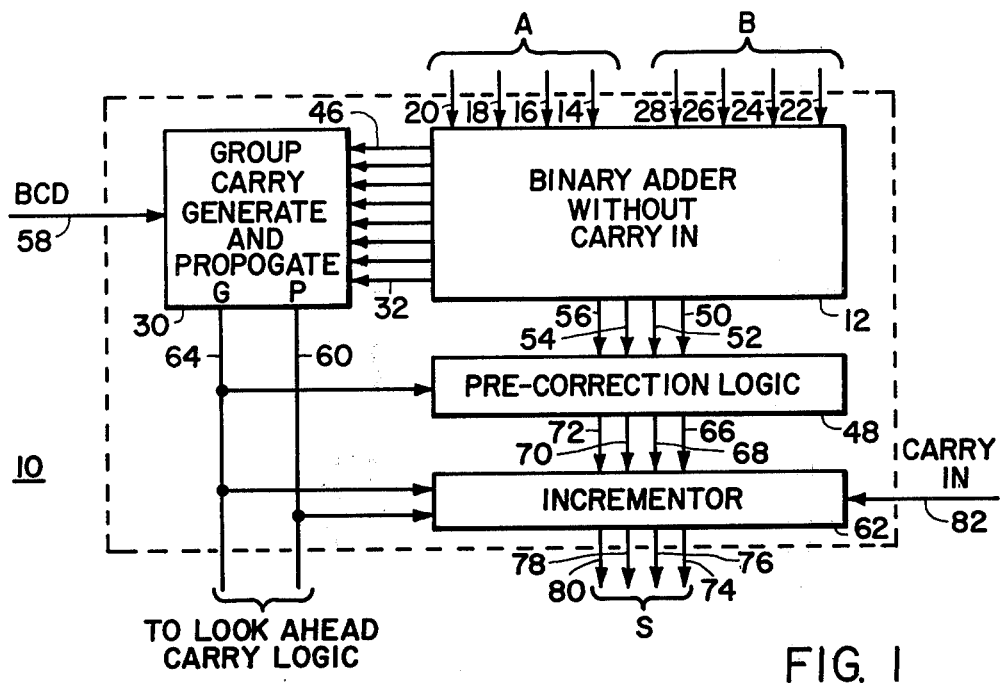
FIG. 1 shows a block diagram of a binary/BCD adder according to the present invention.

FIG. 1 shows a block diagram of a binary/BCD adder circuit 10 which is a particular embodiment of the present invention. Adder circuit 10 comprises a binary adder 12 which coupled to input conductors 14, 16, 18 and 20 which are the inputs for a four bit A operand and inputs 22, 24, 26, 28 which are the inputs for a four bit B operand. Binary adder 12 couples to group carry generate and propagate circuit 30 via conductors 32 through 46 which are the bit carry generate and carry propagate signals from binary adder circuit 12. Binary adder circuit 12 also couples to precorrection logic circuit 48 via conductors 50, 52, 54 and 56 which transmit the first result formed by binary adder 12. Group carry generate and propagate circuit 30 couples to conductor 58 which is the BCD or binary selection control input for adder circuit 10. Circuit 30 produces a group carry propagate output on conductor 60 which couples to incrementer 62 and to look ahead carry logic external to circuit 10. Circuit 30 also provides a group carry generate output on conductor 64 which couples to precorrection logic 48, to incrementer 62 and to look-ahead carry logic external to circuit 10. Precorrection logic 48 couples to incrementer 62 via conductors 66, 68, 70 and 72 which transmit the second result formed by precorrection logic 48. Incrementer 62 couples to output conductors 74, 76, 78 and 80 which form the final binary or BCD sum of circuit 10. Incrementer 62 also couples to conductor 82 which is the carry in input to circuit 10.

Figure 2:
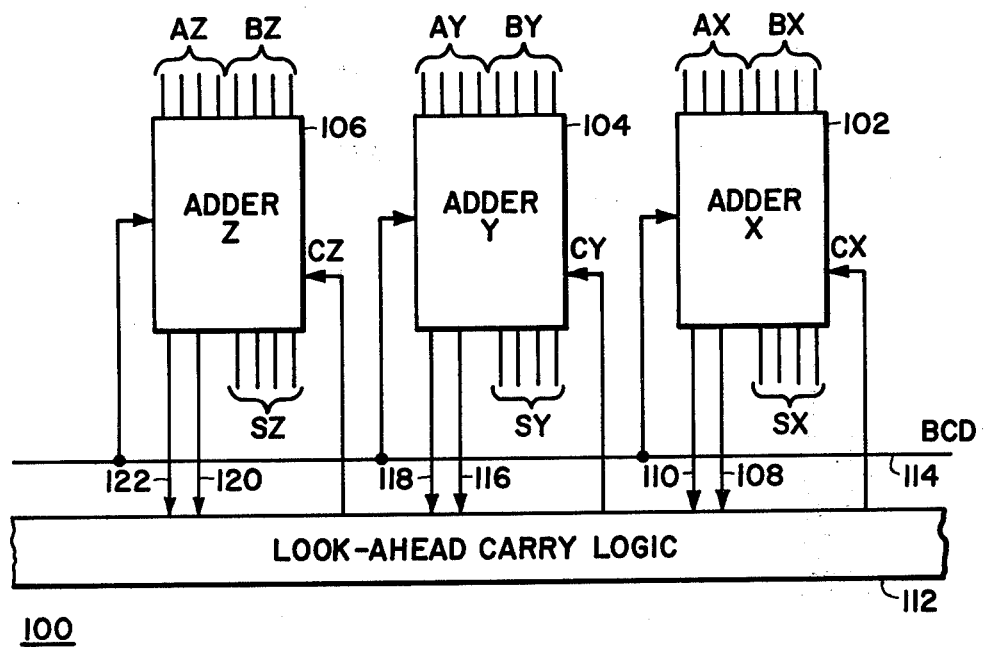
FIG. 2 shows a block diagram of an adder system incorporating a plurality of adders of the type shown in FIG. 1.

FIG. 2 shows a partial system block diagram 100 illustrating an embodiment in which a plurality of adder circuits of the type shown in FIG. 1 can be incorporated to form an adder system for adding groups of BCD numbers or larger binary numbers. Adder system 100 comprises X adder 102, Y adder 104 and Z adder 106. X adder 102 has as inputs four bit operand AX and four bit operand BX which are combined to form four bit sum SX and group carry generate and carry propagate signals on conductors 108 and 110 which couple to look-ahead carry logic 112. X adder 102 also has as an input input carry CX which couples to look-ahead carry logic 112 and a BCD control input which couples to control conductor 114. Similarly, Y adder 104 has as inputs four bit operand AY and four bit operand BY, which are combined to form four bit sum SY and group carry generate and group carry propagate signals on conductor 116 and 118 respectively which couples to look ahead carry logic 112. Y adder 102 also has a carry-in input CY which couples to look-ahead carry logic 112 and a BCD control input which couples to control conductor 114. Adder 106 has as inputs four bit operand AZ and four bit operand BZ which are combined to form four bit sum SZ and group carry generate and group carry propagate signals on conductors 120 and 122, respectively, which couple to look-ahead carry logic 112. Z adder 106 also has a carry in input CZ which couples to look-ahead carry logic 112 and a BCD control input which couples to control conductor 114.

Figure 3A:
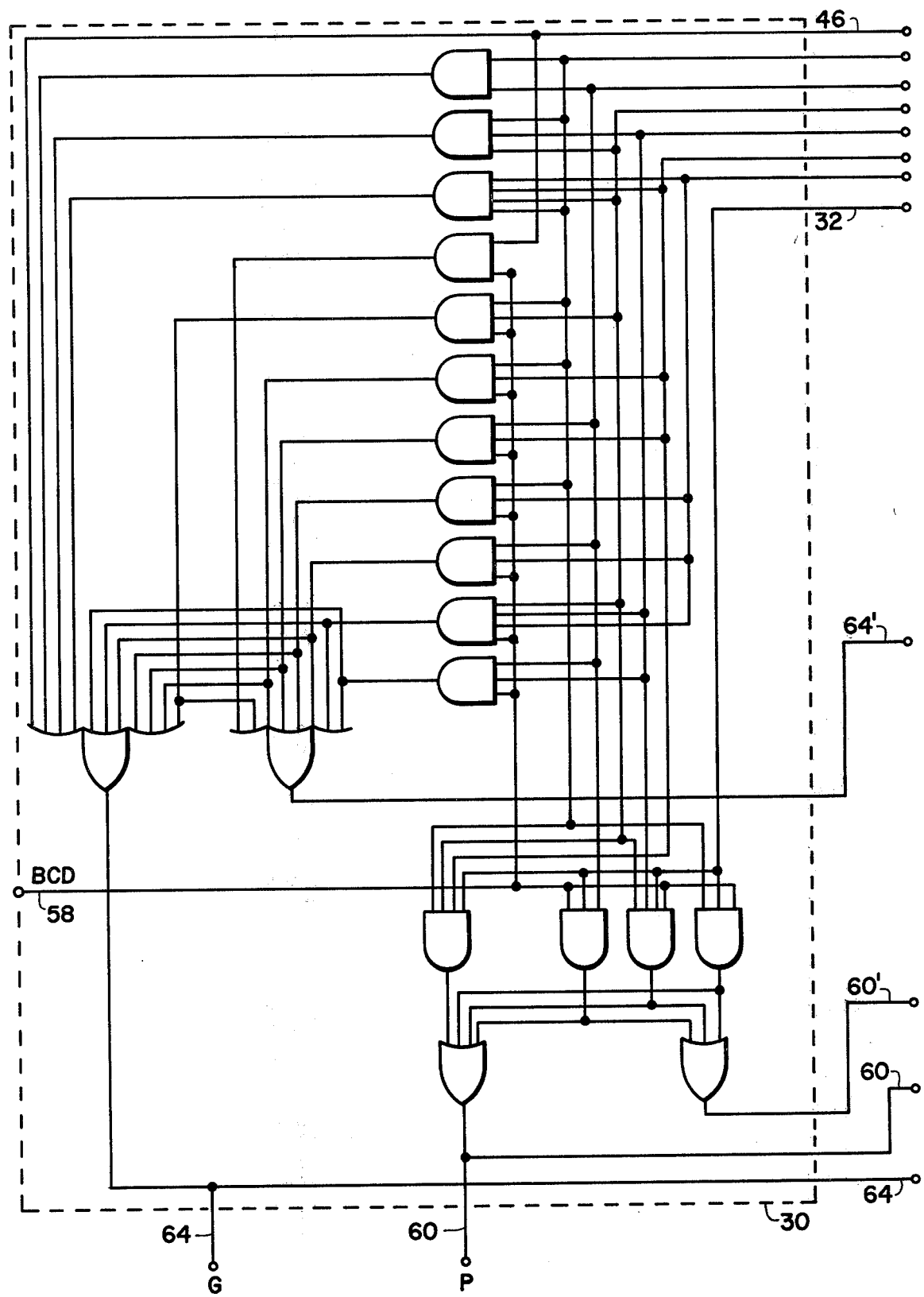
FIGS. 3a and 3b show a detailed logic schematic of a binary/BCD adder according to the present invention.
Figure 3B:
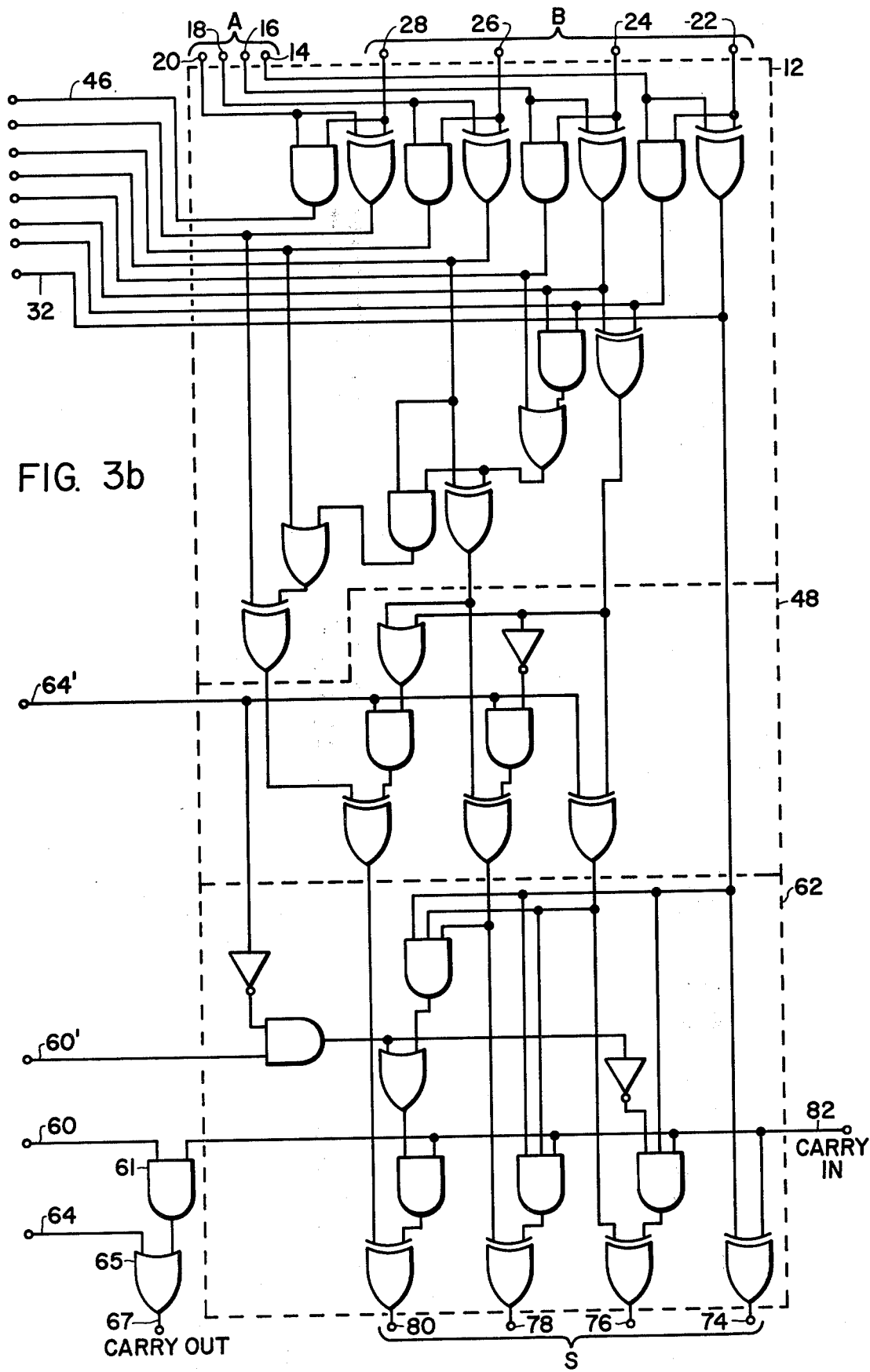

FIGS. 3a and 3b show a detailed logic diagram which is one particular embodiment of adder circuit 10 shown in block diagram form in FIG. 1.

FIG. 3a shows group carry generate and propagate circuit 30 which has bit carry generate and carry propagate signals as inputs on conductors 32 through 46 and a BCD/binary control input signal on conductor 58 and produces as outputs the group carry propagate signal on conductor 60 and the group carry generate signal on conductor 64. FIG. 3b shows binary adder 12 which has as inputs operand A on conductors 14, 16, 18 and 20 and operand B on conductors 22, 24, 26 and 28. FIG. 3b also shows precorrection logic 48 coupled to binary adder 12 and also coupled to incrementer 62 which has as an output sum S on conductors 74, 76, 78 and 80. A carry in signal from a previous stage couples to incrementer 62 via conductor 82. FIG. 3b also shows logic elements for generating a carry out signal which are not shown in FIG. 1. The carry in signal on conductor 82 couples to one input of AND gate 61 while the group propagate signal on conductor 60 couples to another input of AND gate 61 whose output then couples to an input of OR gate 65. The group carry generate signal on conductor 64 couples to another input of OR gate 65 whose output couples to conductor 67 which is the carry out signal. The carry out signal is used in applications where the adder circuit of FIGS. 3a and 3b is connected as a ripple adder rather than using look ahead carry logic.

The mode of operation of the present invention is understood by first considering the system block diagram of FIG. 2. FIG. 2 shows a group of adder circuits arranged to add numbers which may be represented as binary numbers or as BCD numbers. Logic circuitry internal to each adder circuit responds to the logic state of BCD control conductor 114 to determine whether the input operands (AX,BX,AY,BY, etc.) will be treated as binary numbers or as BCD numbers. The system of FIG. 2 includes look-ahead carry logic 112 to obtain higher adding speeds. This logic has as inputs the group carry propagate and group carry generate conductors from each of the adder circuits and produces as outputs the carry in signals to each adder circuit. Depending upon the logic state of BCD control conductor 114, each adder circuit will produce signals on the group carry propagate and group carry generate conductors appropriate for either binary or BCD addition. For example, assuming a BCD mode of operation, Y adder 104 will produce a group carry propagate signal on conductor 116 when the sum of operand AY and BY is equal to 9, indicating to look-ahead carry logic 112 that a carry in to Y adder 104 should be propagated to Z adder 106. Similarly, Y adder 104 will produce a group carry generate signal on conductor 118 when the sum of operands AY and BY is greater than 9, indicating that a carry in to Z adder 106 should be generated. If a binary mode of operation is assumed, Y adder 104 will produce a group carry propagate signal when the sum of operands AY and BY is equal to 15 and a group carry generate signal when the sum of operands AY and BY is greater than 15. It is important to note that although the use of group carry generate and propagate signals speeds up addition by allowing the carry inputs for each group to be formulated simultaneously, the final sum (for example, SY of Y adder 104) cannot be formed until the carry input has been generated by the look-ahead carry logic and applied to the adder circuit.

Next, the addition of BCD numbers using binary techniques is considered as is best illustrated by an example. Assume it is required to form the sum;

```
  258
 +498
  756
```

Each digit of the operands are represented as BCD numbers and the BCD adder circuit must correctly form the BCD representation of the corresponding sum digit. Focusing on the middle digits of the above sum, one method which uses binary techniques uses the following step:

STEP 1

Add the BCD operand digits and the carry digit as binary numbers to form a first result

| 0101 | A operand | (=5) |
|------|-----------|------|
| 1001 | B operand | (=9) |
| +  1 | Carry     | (=1) |
| 1111 | First Result | |

Note that the first result is not a valid BCD code which is indicative of the correction procedure accomplished by the next step.

STEP 2

Compare the first result to binary 9. If the first result is less than or equal to 9, the first result is the correct BCD digit of the sum. If the first result is greater than 9, add binary 6 to the first result to obtain the correct BCD digit of the sum.

| | |
|---|---|
| 1111 | First Result |
| 0110 | Correction Factor |
| 0101 | BCD Sum Digit (=5) |

Note that the most significant bit of the sum is ignored.

A significant limitation in the above method is the fact that the first result cannot be formulated until after the carry in from a previous stage is available. Thus, even though carry look-ahead techniques reduce the carry propagation time, the time required to form the final BCD digit of the sum must include all of the carry propagation time plus the additional time for applying a correction factor (by adding binary 6).

The heart of the present invention resides in the fact that it eliminates the limitation described above. The manner in which this is accomplished is conveniently illustrated by repeating the numerical example given above showing the modified sequence of steps representative of the present invention.

STEP 1

Add the BCD operand digits as binary numbers (without a carry digit) to form a first result.

| | |
|---|---|
| 0101 | A operand (=5) |
| 1001 | B operand (=9) |
| 1110 | First Result |

Again note that the first result is not a valid BCD code which is thus indicative of the correction procedure accomplished by the next step.

STEP 2

Compare the first result to binary 9 and add an appropriate correction factor to the first result to form a second result. If the first result is less than or equal to 9, the correction factor is 0. If the first result is greater than 9, the correction factor is 6.

| | |
|---|---|
| 1110 | First Result |
| 0110 | Correction Factor |
| 0100 | Second Result |

Again note that the most significant bit of the second result is ignored.

STEP 3

Increment the second result with carry-in to obtain the correct BCD digit of the sum

| | |
|---|---|
| 0100 | Second Result |
| 1 | Carry In |
| 0101 | BCD Sum Digit |

In performing Step 3 for BCD addition, the second result must be incremented to the next sequential BCD digit, i.e., 7, 8, 9, 0, 1, 2, etc.

The above example illustrates two key advantages of the present invention. First, the addition of the correction factor required for a particular BCD digit is performed before the input carry for that particular digit is generated by the look-ahead carry logic. This overlapping of operations significantly reduces the amount of time required to add digits in the BCD mode. Second, the use of a final incrementing step to incorporate carry in for forming the final BCD sum allows simpler circuit implementation which can operate at higher speeds than the circuits required for a complete addition step.

FIG. 1 shows an adder circuit 10 according to the present invention which performs BCD addition as illustrated in the above example. Adder circuit 10 is arranged to add in either the BCD mode or the binary mode as defined by the logic state of BCD control conductor 58. In the BCD mode, the A operand and the B operand are each 4 bit BCD numbers. Binary adder 12 adds these numbers as binary numbers to form a 4 bit first result on conductors 50, 52, 54 and 56 as illustrated in Step 4 of the above example. Binary adder 12 also produces individual bit carry propagate and carry generate signals on conductors 32–46 thereby providing the inputs required by circuit 30 to produce the group carry generate and group carry propagate signals required by lookahead carry logic. Pre-correction logic 48 applies a correction factor to the 4 bit first result on conductors 50, 52, 54 and 56 to form a 4 bit second result on conductors 66, 68, 70 and 72 as illustrated in Step 2 of the above example. For the BCD mode, the group carry generate signal on conductor 64 determines whether the required correction factor is binary 0 or binary 6. Incrementor circuit 62 responds to the carry in signal on conductor 82 to increment the second result on conductors 66, 68, 70 and 72 by 1 thereby forming the final BCD sum S on conductors 74, 76, 78 and 80 as illustrated in Step 3 of the above example. Another major advantage of the present invention as shown by the block diagram of FIG. 1 is the fact that major portions of the logic circuitry are the same for addition in the BCD mode and addition in the binary mode. Thus, the circuitry and operation of binary adder 12 is the same for either BCD or binary addition. Major portions of circuit 30 are the same for either adding mode with the BCD control conductor 58 enabling logic in circuit 30 to produce group carry generate and group carry propagate signals on conductors 64 and 60 respectively appropriate for the given mode and thereby also providing appropriate adding mode control for pre-correction logic 48 and incrementor 62. Since the "pre-correction factor" required for addition in the binary mode is always binary 0 which is the same as one of the factors required for the BCD mode, the circuitry required for pre-correction logic 48 is the same for both modes. Finally, incrementor 62 performs the same basic function in each addition mode with control information on conductors 60 and 64 conditioning incrementor 62 to function as a BCD incrementor (7, 8, 9, 0, 1, 2, . . .) or as a binary incrementor (13, 14, 15, 0, 1, 2,).

The above features of the invention offer significant advantages in providing an adder with both binary and BCD capability which has greatly reduced circuit complexity and improved operating speed. These advantages are particularly important in monolithic integrated circuit embodiments. In one such embodiment, using the circuit organization shown in FIG. 1, the combined binary and BCD addition capability was obtained with only a 4% increase in component count from that required for a binary capability alone. Also, the embodiment of FIG. 1 resulted in BCD addition speeds which were equal to binary addition speeds—a 30% to 40% improvement over the speeds obtained by the conventional approach illustrated by the first numerical example above.

What is claimed is:

1. An adder circuit for forming the BCD sum of a first BCD digit and a second BCD digit comprising:

a. means for adding said first and second BCD digits as binary numbers without carry-in to form a first result;
b. means for adding a BCD correction factor to said first result without carry-in to form a second result; and
c. means for incrementing said second result by one in response to a carry-in signal to form said BCD sum.

2. An adder circuit for forming the BCD sum of a first BCD operand and a second BCD operand comprising:
a. means for adding the corresponding digits of said operands as binary numbers without carry-in to form a set of first results;
b. means for adding a BCD pre-correction factor to each said first result without carry-in to form a set of second results; and
c. means for incrementing each said second result by decimal one in response to a carry-in signal to form the digits of said BCD sum.

3. An adder circuit as recited in claim 2 wherein said BCD pre-correction factor is binary six if said first result is greater than nine and said BCD pre-correction factor is binary zero otherwise.

4. The adder circuit recited in claim 3 wherein said means for adding the digits of said first and said second BCD operands comprise a binary adder circuit without carry-in.

5. The adder circuit recited in claim 4 further comprising group carry generate and propagate means coupled to said binary adder circuit for generating a group carry generate signal and a group carry propagate signal to facilitate lookahead carry addition.

6. The adder circuit recited in claim 5 further comprising BCD control means coupled to said group carry generate and propagate means, to said means for adding a BCD pre-correction factor and to said means for incrementing, for converting the operation of the adder circuit to form the binary sum of a first and a second binary operand.

* * * * *